United States Patent Office 3,093,677
Patented June 11, 1963

3,093,677
AROMATIC HALOCARBYL CHEMICAL PRODUCTS
Elmore L. Martin, Wilmington, Del., assignor to E. I. du Pont de Nemours and Company, Wilmington, Del., a corporation of Delaware
No Drawing. Filed Aug. 28, 1959, Ser. No. 836,601
13 Claims. (Cl. 260—465)

This invention relates to new dyestuffs and to their preparation.

The rapid advances which have been made in textile technology have focused attention on the need to provide dyestuffs which are light and wash-fast, which cover all or essentially the entire visible spectrum, and which can be applied to natural fibers and to the newer synthetics with minimum of application variations. The provision of such dyestuffs has been a long standing research objective, which up to now has remained unattained.

An object of the present invention is, consequently, provision of certain novel and useful dyestuffs.

Another object of the invention is provision of a process for making the aforesaid novel dyestuffs.

In the furtherance of the composition of matter aspects of the invention, there is now provided a new class of dyestuffs corresponding to the formula $$Q-\underset{X^1}{C}=\underset{X^2}{C}-Y$$

in which $X^1$ and $X^2$ individually or together are perhalocarbyl and oxoperhalocarbyl; Y is a negative or electron-attracting group; and Q is a color-forming group, i.e., a monovalent organic radical such that the corresponding QH compound is capable of condensing with benzene diazonium chloride to form an azo dye.

More detailed definitions of the symbols of the above formula are as follows:

(a) $X^1$ and $X^2$, alike or different, are separately, monovalent perhalocarbyl or oxoperhalocarbyl radicals of generally no more than 12 carbons or, joined together, divalent perhalocarbyl or oxoperhalocarbyl radicals of generally 2–6 carbons forming with the depicted carbons a carbocyclic ring of 4–8 carbons. Any oxocarbonyl oxygen present is carried by a carbon joined to one of the depicted doubly bonded carbons.

"Perhalocarbyl" as used herein refers to organic radicals composed solely of carbon and halogen. "Oxoperhalocarbyl" refers to organic radicals which contain only carbon, halogen, and oxocarbonyl oxygen. Exemplary perhalocarbyl radicals are perchloro- and perfluoroethyl, perchloropropyl, perbromomethyl, perfluorodecyl, perchloroisobutyl, perfluorotrimethylene, perchlorotetramethylene, 1,1,4,4 - tetrafluoro - 2,3 - dichloro - 2 - butenylene, and the like. Exemplary oxoperhalocarbyl radicals are 2,2,3,3,3 - pentachloropropionyl, 2,3 - dichloro - 1,4-dioxo - 2 - butenylene, perchloroadipoyl, perchloroacetyl, perfluorosuccinyl, and the like;

(b) Y is an electronegative radical of the group consisting of cyano, nitro, alkylsulfonyl, alkarylsulfonyl, arylsulfonyl, aralkylsulfonyl, carboxy, alkoxycarbonyl, carbamyl, halocarbonyl and acyl (i.e., alkylcarbonyl), all of generally no more than 12 and preferably no more than 8 carbons; and (c) Q is a radical that may be defined in terms of the compound QH from which it is derived. QH is any organic compound capable of condensing with benzene diazonium chloride with the replacement of the depicted hydrogen to form an azo dye. Q may thus be broadly defined as the monovalent radical or residue of a compound QH which reacts with benzene diazonium chloride to form an azo dye. The same hydrogen may be replaced both in the diazo reaction and in that of this invention.

The definition of Q flows from the fact, evident below, that the compounds

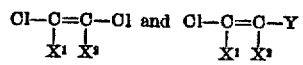

have the same capacity for coupling with color formers (i.e., QH compounds) as do the aryl diazonium salts. The coupling reactions of the aryl diazonium salts are well known and are discussed in detail by K. H. Saunders in "The Aromatic Diazo Compounds and Their Technical Applications," Edward Arnold & Co., London (1949), Sec. Ed., pp. 194–221. See also H. A. Lubs, "The Chemistry of Synthetic Dyes and Pigments," Reinhold Publishing Company, New York (1955), Sec. Ed., pp. 97–111.

The definition of QH is based specifically on the ability to couple with benzene diazonium chloride partly because diazonium chloride is the simplest and most readily available of the aryl diazonium chlorides and partly because such a definition points out that hydrocarbon compounds such as benzene and monoalkoxy benzenes are not included among the color formers. Benzene and anisole, for example, will react with certain highly activated aryl diazonium halides but not with benzene diazonium chloride to yield azo dyes.

The test to determine reactivity with benzene diazonium chloride may be conducted as follows:

Benzene diazonium chloride is prepared by treating one molar equivalent of aniline with 2.7 molecular equivalents of hydrogen chloride as a concentrated aqueous solution. This solution is cooled to 0° C. and treated with one molecular equivalent of sodium nitrite, dissolved in twice its weight of water. The addition of the nitrite solution is carried out at a rate so that the temperature does not exceed 5° C. To ten milligrams of compound QH dissolved in one to two ml. of acetone there is added about 0.25 g. of sodium acetate. One to three drops of the diazonium solution are then added to the test mixture. When QH contains an electron-donating group or is an active methylene compound, the addition of the benzene diazonium chloride causes immediate formation of an azo dye ranging in color from deep orange through red-purple to green. An alternative method for expressing the result is that there is formed an azo compound having at least one absorption peak between 350 and 750 millimicrons.

QH compounds usefully employable in the present invention are of two kinds, namely (1) those aromatic compounds containing electron donating groups and (2) compounds containing active methylene groups.

In preferred QH compounds, Q may be $R_2NAr-$, RCONHNRAr—, RCH=NN—RAr—, $$R_2N-N=CH-(CH=CH)_nAr-$$
$$(R'_2NAr)_2-C=CH-BB'CH-$$

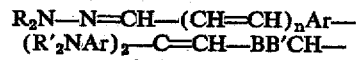

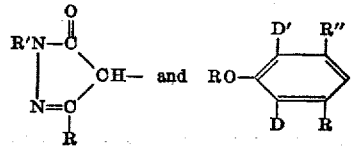

in which Ar is arylene; R and R" are hydrogen or hydrocarbyl; R' is hydrocarbyl, beta-alkoxyethyl, beta-acyloxyethyl, beta-cyanoethyl, or beta-trialkylammonium ethyl; B and B' are —CN, —COOR, —COR, —CONR$_2$, —CSNR$_2$, —SO$_2$R, —NO$_2$, —NR$_3^+$, and —SR$_2^+$; D is alkyl, halogen, —SO$_3$Na, or B; D' is hydrogen or D, with the proviso D' and R" taken together may form another aryl ring; and $n$ is 0 or 1. In a given compound the several embodiments of R and R' that may be involved may be the same or different.

Aryl and arylene refer, respectively, to monovalent and to divalent aromatic radicals. In the latter the divalency stems from different carbon atoms. Among the aryl and arylene radicals are included those from which the corresponding aromatic compound obtained by placing hydrogen at the respective bonds of the aryl or arylene group has a resonance energy of not less than 20 kcal./mole. Resonance energies of organic compounds and the determination of resonance energy is shown by Linus Pauling in "The Nature of the Chemical Bond," Sec. Ed., Cornell University Press, 1945, pages 132–139.

Aryl groups particularly suited are phenyl, naphthyl, anthryl, phenanthryl, benzpyryl, trypticyl, furyl, thienyl, pyrrolyl, and the corresponding arylene groups phenylene, naphthylene, anthrylene, furylene, thienylene, and pyrrolylene.

Hydrocarbyl refers to any monovalent organic radical composed solely of carbon and hydrogen. The hydrocarbyl groups can be alkyl, cycloalkyl, aryl, aralkyl, alkaryl, single ring, multiple ring, straight chain, branched chain, large or small. The widest variation does not detract from the fundamental characteristics of the hydrocarbyl radical of passing unchanged in the process by which the products of this invention are made. In general, hydrocarbyl groups containing not more than 20 carbon atoms are most available and to that extent are preferred. There is no question of the operability of and the intent to include and disclose all hydrocarbyl groups whatsoever.

QH compounds containing an active methylene group, e.g., BB'CH—, above, are those compounds which contain the methylene group adjacent to two carbonyl or other strongly electron-attracting groups. This methylene group is discussed by Saunders, op. cit., pp. 207–217, is mentioned by Lubs, op. cit., pp. 101 and 102, and is well known to workers in the azo dye art as a site of coupling reactions. Compounds containing active methylene groups are at least partly aliphatic in nature. When the active methylene group is adjacent to a carbonyl group, the compound is capable of existing in the tautomeric keto-enol form. Coupling in the process of the present invention is through the active methylene group, one of the hydrogens being substituted.

The process aspects of this invention may be illustrated schematically as follows:

(1) 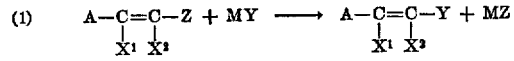

(2) 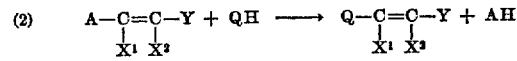

In these equations A and Z are halogen of atomic number 9 through 35, i.e., fluorine, chlorine, or bromine; Q, $X^1$, $X^2$, and Y have the previously-indicated meanings; and M is a metal, preferably an alkali metal such as sodium or potassium.

The process of the invention may be accomplished simply by adding the various starting materials together and separating the resultant colored product by obvious means. There are no particularly critical process variables involved. It is to be understood, however, that the intermediate product

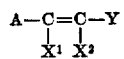

need not be isolated, i.e., the process can be carried out by mixing all of the reactants initially. Likewise, if desired, intermediate

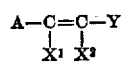

can be prepared separately and then reacted in a separate operation with compound QH.

It is convenient, but not necessary, to effect the reaction between compound

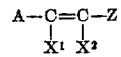

and compound MY and QH in a reaction medium inert to the reactants and to the products. Suitable media are aliphatic and aromatic hydrocarbons, dialkyl ethers, cyclic esters, e.g., dioxane and tetrahydrofuran, N-alkyl acylamides, e.g., dimethyl- and diethylformamides, N-methylformamide, N-methyl-N-ethylacetamide, N,N-dimethylacetamide, N,N - diethylacetamide, N - methylformanilide, etc., tetramethylurea, tetraethylurea, pyridine, dimethylsulfoxide, acetonitrile, etc., nitrosodimethylamine, and trifluoroethanol. In general, the inert medium is used to facilitate the dissipation of heat from the slightly exothermic reaction.

As previously stated, M in MY is a metal, preferably an alkali metal such as sodium, potassium, and lithium. MY compounds in which M is sodium are generally used because of the lower cost of sodium as compared to the other alkali metals.

The temperature at which the reaction is carried out can be varied widely, e.g., from below —10° C. up to the decomposition temperature of the reactants or products. As a rule, the best results from the standpoint of product yield and reaction rate are achieved at temperatures of from 0° C. to 100° C. and this range embraces the conditions most generally used. Pressure is not a critical variable and ambient atmospheric pressure is generally used for convenience, although pressures above or below can be employed, if desired. The time of the reaction is dependent upon the particular reactants employed and can vary up to one hour or more.

Complete reaction between compound

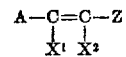

and compounds QH and MY, of course, requires the use of at least equimolar quantities of each reactant. This fact, however, in no way limits the molar proportions of these reactants and the relative amounts of each can be varied widely. Generally the use of a large excess of one or other of the reactants have little value in improving product yield. For that reason, approximately equimolar quantities are usually employed.

Exemplary compounds of the formula

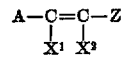

usable in the process of the invention are shown in Table I. Exemplary intermediate compounds of the formula

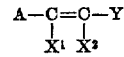

are shown in Table II.

TABLE I

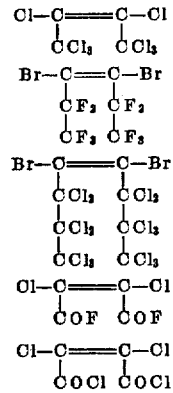

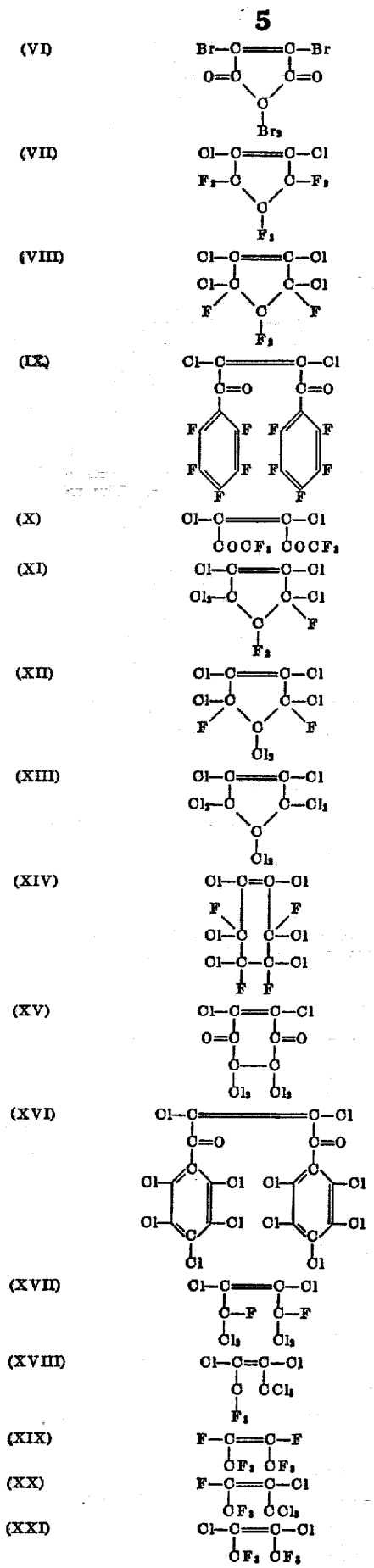
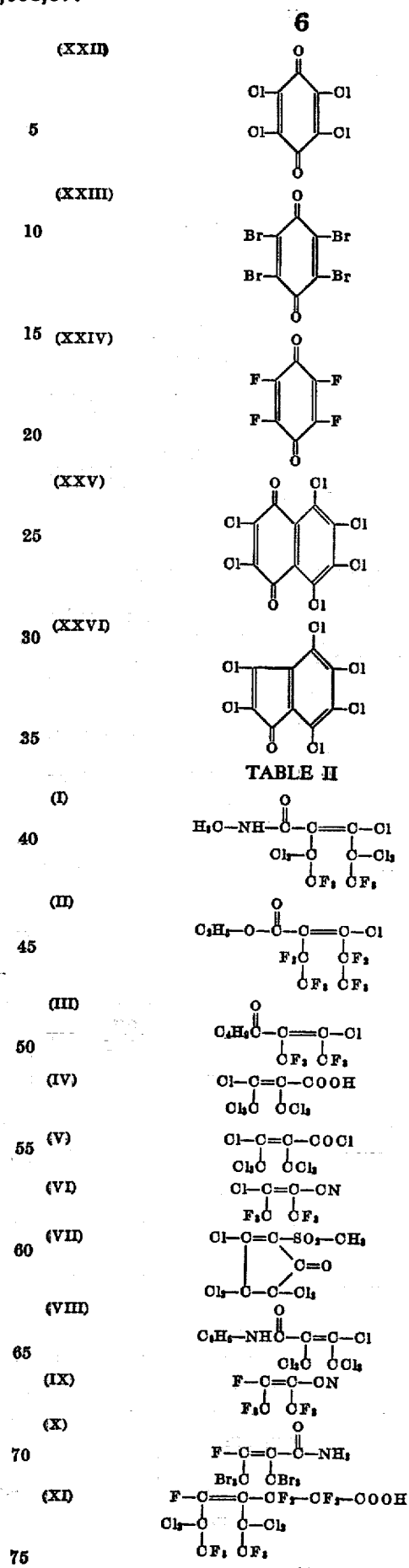

(XII) 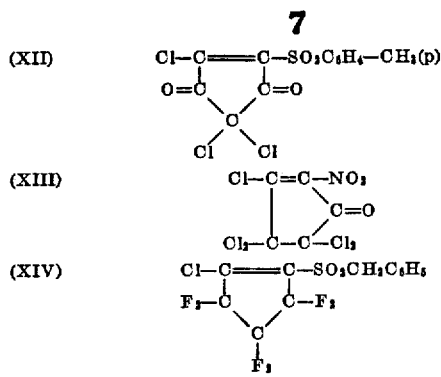

(XIII)

(XIV)

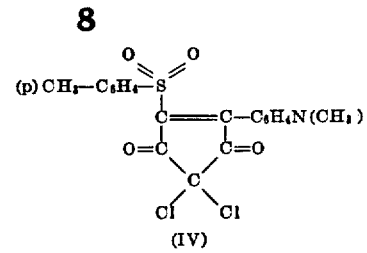

(IV)

Representative usable QH compounds of the aromatic type are: 2,6-dimethylphenol; 1-acetyl-2-methyl-2-phenylhydrazine; sodium 1-naphthol-2-sulfonate; N-allyl-N-methylaniline; N,N - dibenzylaniline; N - cyclohexyl-N-methylaniline; N-methyl-N-propargylaniline; N,N-diethyl-alpha-naphthylamine; N,N - di(beta - ethoxyethyl)aniline; N,N-di(beta-acetoxyethyl)aniline; N,N-dimethylaniline; N,N-dioctadecylaniline; N - (beta - benzoyloxyethyl)-N-methylaniline; 3-methylsalicylamide of m-aminobenzaldehyde ethylene glycol acetal; beta-(N-ethylanilino)ethyltrimethylammonium chloride; beta-(N-dodecylanilino) ethyldimethylamine hydrochloride; beta-(N-ethyl-alpha-naphthylamino)ethyltriethylammonium chloride; and the like.

Representative QH compounds containing active methylene groups are acetoacetic ester and its amides; the ester, nitrile, amide, and mixed functions of malonic acid; acetylacetone; acetonedicarboxylic acid, its esters and amides; cyclic 1,3-diketones; beta-ketonitriles; beta-sulfonyl nitriles; cyanoacetic ester; cyanoacetamides; beta-nitronitriles; beta-nitroesters; malononitrile dimer; 3-(2-furyl)acrolein dimethylhydrazone; and the like.

There follow some examples which illustrate, but are not intended to limit, the invention.

Example 1

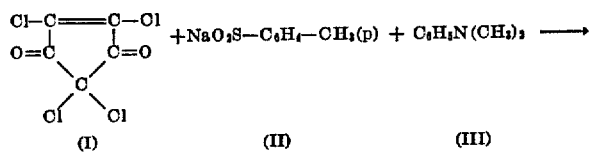

A solution of 2.34 g. of tetrachlorocyclopentene-1,3-dione (I), prepared as described in J. Am. Chem. Soc. 78, 489 (1956), in 25 cc. of dimethylformamide was cooled to 15° C. To the solution there was added 2.4 g. of N,N-dimethylaniline (III), followed by 1.8 g. of finely powdered anhydrous sodium p-toluene sulfinate (II). Throughout the addition of the sodium p-toluenesulfinate the temperature of the reaction mixture was kept at 15° to 20° C. by means of external cooling. After stirring for 10 minutes at 15° to 20° C., the reaction mixture was diluted with petroleum ether and water. The resulting solid was taken up in methylene chloride, the solution was concentrated to a small volume, and anhydrous ether was added. The crystalline material was collected and recrystallized three additional times. There was obtained 0.9 g. of a black crystalline compound (IV) melting at 167° to 169° C., having a molecular extinction coefficient 24,600 at 562 mμ, and identified as 2,2-dichloro-4-(p-dimethylamino)-5-(p-toluene sulfonyl)-cyclopentane-1,3-dione.

*Analysis.*—Calcd. for $C_{20}H_{17}O_4NSCl_2$: C, 54.79%; H, 3.91%; Cl, 16.19%. Found: C, 54.79%; H, 4.12%; Cl, 16.52%.

Examples 2–8

Table III summarizes a series of experiments in which 5 g. of the coupler shown in column 2 is dissolved in 472 g. of N,N-dimethylformamide and heated in turn with 5 g. of QH compound (column 3) and 5 g. of compound MY (column 4). The mixture is then warmed on the steam bath for a few minutes, during which time the compound shown in column 5 is formed.

TABLE III

| Ex. | Coupler<br>A—C=C—Z<br>X¹ X² | QH (color-former) | MY | Product<br>Q—C=C—Y<br>X¹ X² | Color (λ max.-mμ) |
|---|---|---|---|---|---|
| 2 | Cl—C=C—Cl<br>(F₂C)₂ (CF₂)₂<br>Cl Cl | A¹ | C¹ | p-(CH₃)₂NC₆H₄—C=C—CN·<br>(F₂C)₂ (CF₂)₂<br>Cl Cl | Orange-red (530). |
| 3 | Cl—C=C—Cl<br>CF₃ CF₃ | A | C | p-(CH₃)₂NC₆H₄—C=C—CN·<br>CF₃ CF₃ | Red (503:370). |
| 4 | Cl—C=C—Cl<br>F₂C CF₂<br>ClC=CCl | A | C | p-(CH₃)₂NC₆H₄—C=C—CN·<br>F₂C CF₂<br>ClC=CCl | Red (550:300). |
| 5 | Cl—C=C—Cl<br>CF₃ CF₃ | A | D¹ | p-(CH₃)₂NC₆H₄—C=C—SO₂C₆H₄CH₃(p)<br>CF₃ CF₃ | Yellow (—). |
| 6 | Cl—C=C—Cl<br>CF₃ CF₃ | B¹ | C | [p-(CH₃)₂NC₆H₄]₂=C=C—H<br>C=C—CN<br>CF₃ CF₃ | Pale green (—)₁ |
| 7 | Cl—C=C—Cl<br>F₂C CF₂<br>CF₂ | A | C | p-(CH₃)₂NC₆H₄—C=C—CN<br>F₂C CF₂<br>CF₂ | Red (—); |

See footnote at end of table.

| Ex. | Coupler $A-C=C-Z$ $X^1\ X^2$ | QH (color-former) | MY | Product $Q-C=C-Y$ $X^1\ X^2$ | Color (λ max.-mμ) |
|---|---|---|---|---|---|
| 8 | $Cl-C=C-Cl$ $Cl_3C\ \ \ \ C=O$ $\ \ \ \ \ CCl_3$ | A | C | $p-(CH_3)_2NC_6H_4-C=C-CN$ $Cl_3-C\ \ \ \ C=O$ $\ \ \ \ \ \ C$ $\ \ \ \ \ \ Cl_3$ | Red (—). |

[1] In Table III, A, standing alone, represents N,N-dimethylaniline; B, 1,1-bis(p-dimethylaminophenyl)ethylene; C, sodium cyanide; and D, sodium p-methylphenylsulfinate.

*Examples 9–26*

Table IV summarizes a series of experiments in which 0.0005 mole of the coupler and 0.0005 mole of the QH compound were dissolved in 3–4 g. of N,N-dimethylformamide. To this solution there was then added 0.0005 mole of MY compound. The reaction mixture was stirred at room temperature for several minutes. During this time the reaction mixture developed the color shown in column 5. Slight warming in a bath at 40–50° C. increased the rate of color formation in those instances where it was slow in developing at room temperature.

TABLE IV

| Ex. | Coupler | QH (color-former) | MY | Product | Color (λ max.-mμ) |
|---|---|---|---|---|---|
| 9 | $Cl-C=C-Cl$ $Cl_3C\ \ CCl_3$ | A[1] | D[1] | $p-(CH_3)_2NC_6H_4-C=C-SO_2C_6H_4CH_3(p)$ $Cl_3C\ \ CCl_3$ | Magenta (542). |
| 10 | $Cl-C=C-Cl$ $Cl_3C\ \ CCl_3$ | B[1] | D | $[p-(CH_3)_2NC_6H_4]_2=C=C-H$ $p-CH_3C_6H_4SO_2-C=C$ $\ \ \ \ \ C\ \ Cl_3C$ $\ \ \ \ \ Cl_3$ | Blue (612). |
| 11 | $Cl-C=C-Cl$ $Cl_3C\ \ \ \ CCl_3$ $\ \ \ \ CCl_3$ | A | D | $p-(CH_3)_2NC_6H_4-C=C-SO_2C_6H_4CH_3(p)$ $Cl_3-C\ \ \ \ C-Cl_3$ $\ \ \ \ \ \ C$ $\ \ \ \ \ \ Cl_3$ | Magenta (550). |
| 12 | $Cl-C=C-Cl$ $Cl_3C\ \ \ \ CCl_3$ $\ \ \ \ CCl_3$ | A | E[1] | $p-(CH_3)_2NC_6H_4-C=C-SO_2CH_3$ $Cl_3-C\ \ \ \ C-Cl_3$ $\ \ \ \ \ \ C$ $\ \ \ \ \ \ Cl_3$ | Magenta (555). |
| 13 | $Cl-C=C-Cl$ $Cl_3C\ \ \ \ CCl_3$ $\ \ \ \ CCl_3$ | A | F[1] | $p-(CH_3)_2NC_6H_4-C=C-SO_2C_4H_9(n)$ $Cl_3-C\ \ \ \ C-Cl_3$ $\ \ \ \ \ \ C$ $\ \ \ \ \ \ Cl_3$ | Magenta (570). |
| 14 | $Cl-C=C-Cl$ $Cl_3C\ \ \ \ CCl_3$ $\ \ \ \ CCl_3$ | B | D | $[p-(CH_3)_2NC_6H_4]_2=C=C-H$ $(p)CH_3C_6H_4SO_2-C=C$ $Cl_3-C\ \ \ \ C-Cl_3$ $\ \ \ \ \ \ C$ $\ \ \ \ \ \ Cl_3$ | Blue (670). |
| 15 | $Cl-C=C-Cl$ $Cl_3C\ \ \ \ CCl_3$ $\ \ \ \ CCl_3$ | B | E | $[p-(CH_3)_2NC_6H_4]_2=C=C-H$ $CH_3SO_2-C=C$ $Cl_3-C\ \ \ \ C-Cl_3$ $\ \ \ \ \ \ C$ $\ \ \ \ \ \ Cl_3$ | Do. |
| 16 | $Cl-C=C-Cl$ $Cl_3C\ \ \ \ CCl_3$ $\ \ \ \ CCl_3$ | B | F | $[p-(CH_3)_2NC_6H_4]-C=C-H$ $(n)C_4H_9SO_2-C=C$ $Cl_3-C\ \ \ \ C-Cl_3$ $\ \ \ \ \ \ C$ $\ \ \ \ \ \ Cl_3$ | Blue (635). |

See footnote at end of table.

| Ex. | Coupler | QH (color-former) | MY | Product | Color (λ max.-mμ) |
|---|---|---|---|---|---|
| 17 | Cl—C═══C—Cl, Cl₃C, C=O, C, Cl₂ | A | D | p-(CH₃)₂NC₆H₄—C═══C—SO₂C₆H₄CH₃(p), Cl₃C, C=O, C, Cl₂ | Magenta (535). |
| 18 | Cl—C═══C—Cl, Cl₃C, C=O, C, Cl₂ | A | E | p-(CH₃)₂NC₆H₄—C═══C—SO₂CH₃, Cl₃C, C=O, C, Cl₂ | Magenta (548). |
| 19 | Cl—C═══C—Cl, Cl₃C, C=O, C, Cl₂ | A | G¹ | p-(CH₃)₂NC₆H₄—C═══C—NO₂, Cl₃C, C=O, C, Cl₂ | Blue (610). |
| 20 | Cl—C═══C—Cl, Cl₃C, C=O, C, Cl₂ | B | D | [p-(CH₃)₂NC₆H₄]₂=C=CH—C═══C—SO₂C₆H₄—CH₃(p), Cl₃C, C=O, C, Cl₂ | Cyan (684). |
| 21 | Cl—C═══C—Cl, Cl₃C, C=O, C, Cl₂ | B | E | [p-(CH₃)₂NC₆H₄]₂=C=CH—C═══C—SO₂CH₃, Cl₃C, C=O, C, Cl₂ | Cyan (680). |
| 22 | Cl—C═══C—Cl, Cl₃C, C=O, C, Cl₂ | B | G | [p-(CH₃)₂NC₆H₄]₂=C=CH—C═══C—NO₂, Cl₃C, C=O, C, Cl₂ | Cyan (720). |
| 23 | Cl—C—(Cl)C—C—Cl, Cl—C—C—C—Cl(Cl), C, O | A | D | p-(CH₃)₂NC₆H₄—C=C—SO₂C₆H₄CH₃(p), O=C, Cl—C—C—Cl, Cl—C=C—Cl | Red (498). |
| 24 | Cl—C—(Cl)C—C—Cl, Cl—C—C—C—Cl(Cl), C, O | B | D | [p-(CH₃)₂NC₆H₄]₂=C=CH—C=C—SO₂C₆H₄CH₃(p), O=C, Cl—C—C—Cl, Cl—C=C—Cl | Blue (612). |
| 25 | CF₃CCl=CClCF₃ | B | G | [p-(CH₃)₂NC₆H₄]₂=C=CH—C=C—NO₂, F₃C, CF₃ | Red (—). |
| 26 | ClC=CCl, C=O, Cl₂C—CCl₂ | B | H¹ | [p-(CH₃)₂NC₆H₄]₂=C=CH—C=C—SO₂—CH₂—C₆H₅, C, Cl₂C—CCl₂ | Blue (612). |

¹ In Table IV, A, standing alone, represents N,N-dimethylaniline; B, 1,1-bis(p-dimethylaminophenyl)ethylene; D, sodium p-methylphenylsulfinate E, sodium methylsulfinate; F, sodium butylsulfinate; G, sodium nitrite; and H, sodium benzylsulfinate.

Table V presents a list of additional aromatic QH compounds containing electron-attracting groups which may be substituted for the N-dimethylaniline of Example I, in the process of Example I, to give the compounds shown in the second columns. Table VI sets forth the same information for some representative active methylenic compounds. In these two tables the generic formula of the product molecule may be written

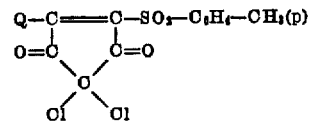

Q being as defined above. B represents all of the molecule except Q, i.e.,

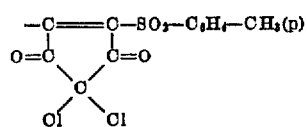

TABLE V

| Example | QH (color-former) | Product |
|---|---|---|
| 27 | N-methyl-N-β-cyano-ethylaniline | $H_3C$<br>$\quad\diagdown N-C_6H_4-B$<br>$NC-CH_2-CH_2\diagup$ |
| 28 | Furylacrolein phenylhydrazone | $C_6H_5-NH-N=CH-CH=CH-\langle furyl \rangle-B$ |
| 29 | Pyrrole-2-aldehyde dimethylhydrazone | $(CH_3)_2-N-N=CH-\langle pyrrolyl\text{-}NH \rangle-B$ |
| 30 | 1-benzoyl-2-phenylhydrazine | $C_6H_5-\overset{O}{\underset{\|}{C}}-NH$<br>$\qquad\quad N-B$<br>$\qquad\quad C_6H_5$ |
| 31 | 1,2,5-trimethylpyrrole | $H_3C-\langle pyrrolyl \rangle-CH_3$ with B at 3-position, $N-CH_3$ |
| 32 | Sodium salt of 1-naphthol-2-sulfonic acid | naphthalene with $SO_3Na$, $OH$, and $B$ substituents |
| 33 | p-Methoxybenzaldehyde-p-methoxyanil | $H_3C-O-C_6H_4-N-\overset{}{C}-B$<br>$\qquad\qquad H_3CO-C_6H_4-N\!\!=\!\!$ |
| 34 | N-n-butylcarbazole | carbazole with $B$ at 3-position and $N-C_4H_9$ |
| 35 | m-Diethylaminophenol | $(C_2H_5)_2N-C_6H_3(OH)-B$ |
| 36 | β-(N-ethylanilinoethyl)trimethylammonium chloride | $\overset{\ominus}{Cl}(CH_3)_3\overset{\oplus}{N}-CH_2CH_2-N-C_6H_4-B$<br>$\qquad\qquad\qquad\qquad\quad C_2H_5$ |
| 37 | Benzaldehyde phenylhydrazone | $C_6H_5-CH=N-NH-C_6H_4-B$ |
| 38 | 1,1-bis(p-dimethylaminophenyl)ethylene | $[(CH_3)_2N-C_6H_4-]_2C=CH-B$ |
| 39 | 1-phenyl-3-methylpyrazolone | $C_6H_5-N-\overset{\phantom{}}{\underset{\phantom{}}{}}C=O$<br>$\qquad\quad N\diagdown\quad\diagup C-B$<br>$\qquad\qquad\quad C$<br>$\qquad\qquad\quad CH_3$ |
| 40 | 2,6-dimethylphenol | $HO-C_6H_2(CH_3)_2-B$ |
| 41 | Resorcinol dimethyl ether | $CH_3O-C_6H_3(OCH_3)-B$ |
| 42 | Indole | indole with $B$ at 3-position |

TABLE VI

| Ex. | QH (color-former) | Product |
|---|---|---|
| 43 | Malononitrile dimer | $(CN)_2C=C(NH_2)CCH(CN)-B$ |
| 44 | Ethyl acetoacetate | $CH_3CO-CH-B$<br>$\phantom{CH_3CO-}|$<br>$\phantom{CH_3CO-}COOC_2H_5$ |
| 45 | Acetylacetone | $(CH_3CO)_2CH-B$ |
| 46 | Malononitrile | $(CN)_2CH-B$ |
| 47 | Ethylcyanoacetate | $(C_2H_5OCO)CH-B$<br>$\phantom{(C_2H_5OCO)}|$<br>$\phantom{(C_2H_5OCO)}CN$ |
| 48 | Acetoacetanilide | $CH_3COCH-B$<br>$\phantom{CH_3CO}|$<br>$\phantom{CH_3CO}CONHC_6H_5$ |
| 49 | Diethyl malonate | $(C_2H_5OOC)_2CH-B$ |
| 50 | Ethyl malonamate | $(C_2H_5OCO)$<br>$\phantom{xxxxxx}\diagdown$<br>$\phantom{xxxxxxxx}CH-B$<br>$\phantom{xxxxxx}\diagup$<br>$(H_2NCO)$ |
| 51 | Diethyl acetonedicarboxylate | $(COOC_2H_5)$<br>$\phantom{xxxxxx}\diagdown$<br>$\phantom{xxxxxxxxx}CH-B$<br>$\phantom{xxxxxx}\diagup$<br>$C_2H_5OOCCH_2CO$ |
| 52 | 1,3-cyclohexanedione | 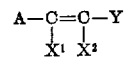 |
| 53 | 2 - ethoxycarbonylcyclopentanone | 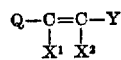 |
| 54 | Acetoacetonitrile | $(CH_3CO)(CN)CH-B$ |
| 55 | Methylsulfonylacetonitrile | $(CH_3SO_2)(CN)CH-B$ |
| 56 | Cyanoacetanilide | $(CONHC_6H_5)(CN)CH-B$ |
| 57 | Ethyl nitroacetate | $(COOC_2H_5)(NO_2)CH-B$ |
| 58 | Nitroacetonitrile | $(CN)(NO_2)CH-B$ |

The compounds of this invention are colored and are useful as dyestuffs in all applications where dyestuffs are known to be useful, such as coloring pigments for plastics, paints, and the like. They are also useful in the dyeing of textiles as shown below:

A dye bath is prepared using 10,000 g. of water containing 2 g. of a sulfonated lignin dispersant ("Marasperse CB," Marathon Co.) and 5 g. of acetic acid. A solution of 2 g. of 2,2-dichloro-4-(p-dimethylaminophenyl)-5-(p-toluenesulfonyl)cyclopentene-1,3-dione, prepared as in Example I, in 100 g. of acetone is added with stirring. The dye bath is heated at 80–95° C. and swatches of cellulose acetate, nylon, silk, and wool weighing 10 g. each are added. After a few minutes the cellulose acetate fabric is dyed yellow and the nylon, silk, and wool are dyed brown. These dyeings have good light- and wash-resistance.

Since obvious modifications and equivalents in the invention will be evident to those skilled in the chemical arts, I propose to be bound solely by the appended claims.

I claim:

1. A compound of the formula $$Q-C=C-Y$$
$$\phantom{Q-}\underset{X^1}{|}\phantom{=}\underset{X^2}{|}$$

wherein: $X^1$ and $X^2$ are selected individually from the group consisting of monovalent perhalocarbyl and oxo- perhalocarbyl radicals of up to 12 carbons and, jointly, from the group consisting of divalent perhalocarbyl and oxoperhalocarbyl radicals of up to 6 carbons, any oxocarbonyl oxygen being carried by a carbon joined to one of the depicted doubly bonded carbons; Y is an electronegative radical selected from the group consisting of cyano, nitro, carboxy, carbamyl, halocarbonyl, and alkylsulfonyl, alkarylsulfonyl, arylsulfonyl, aralkylsulfonyl, alkoxycarbonyl and alkylcarbony of up to 12 carbon atoms; and Q is the monovalent organic radical of a compound QH selected from the group consisting of aromatic compounds containing an electron-donating group other than methoxy and compounds containing an active methylene group.

2. The process of producing a compound of claim 2 which comprises reacting, at a temperature between about −10° and 100° C.: (1) a compound of the formula $$A-C=C-Y$$
$$\phantom{A-}\underset{X^1}{|}\phantom{=}\underset{X^2}{|}$$

wherein: A is halogen of atomic number 9–35; $X^1$ and $X^2$ are selected individually from the group consisting of monovalent perhalocarbyl and oxoperhalocarbyl radicals of up to 12 carbons and, jointly, from the group consisting of divalent perhalocarbyl and oxoperhalocarbyl radicals of up to 6 carbons, any oxocarbonyl oxygen being carried by a carbon joined to one of the depicted doubly bonded carbons; and Y is an electronegative radical selected from the group consisting of cyano, nitro, carboxy, carbamyl, halocarbonyl, and alkylcarbonyl of up to 12 carbon atoms; and (2) an organic compound QH selected from the group consisting of aromatic compounds containing an electron-donating group other than methoxy and compounds containing an active methylene group.

3. The process of claim 2 accomplished in an inert reaction medium.

4. The process which comprises reacting, at a temperature between about −10 and 100° C., tetrachlorocyclopentene-1,3-dione, N,N-dimethylaniline, and an alkali metal sulfinate.

5. The process which comprises reacting, at a temperature between about −10 and 100° C., 1,2-dichloro-1,2-bis-(ω-chloroperfluoroethyl)ethylene, N,N - dimethylaniline, and a metal cyanide.

6. The process which comprises reacting, at a temperature between about −10 and 100° C., 1,2-dichloro-1,2-bis-(trifluoromethyl)ethylene, N,N-dimethylaniline, and a metal cyanide.

7. The process which comprises reacting, at a temperature between about −10 and 100° C., 1,2-dichloro-1,2-bis-(trifluoromethyl)ethylene, N,N-dimethylaniline, and an alkali metal p-toluenesulfinate.

8. The process which comprises reacting, at a temperature between about −10 and 100° C., 1,2-dichloro-1,2-bis-(trifluoromethyl)ethylene, 1,1-bis(p-dimethylaminophenyl)ethylene, and a metal cyanide.

9. The compound having the formula

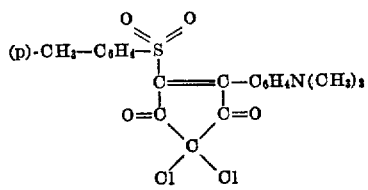

10. The compound having the formula
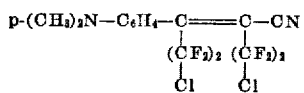
11. The compound having the formula
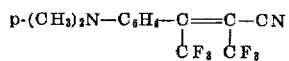
12. The compound having the formula
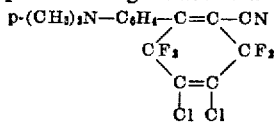
13. The compound having the formula
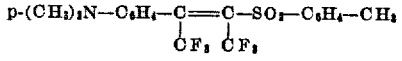
No references cited.

UNITED STATES PATENT OFFICE
CERTIFICATE OF CORRECTION

Patent No. 3,093,677 June 11, 1963

Elmore L. Martin

It is hereby certified that error appears in the above numbered patent requiring correction and that the said Letters Patent should read as corrected below.

Column 16, line 15, for the claim reference numeral "2" read -- 1 --.

Signed and sealed this 31st day of December 1963.

(SEAL)
Attest:
ERNEST W. SWIDER

EDWIN L. REYNOLDS

Attesting Officer

Acting Commissioner of Patents